(12) United States Patent
Mano

(10) Patent No.: US 10,814,536 B2
(45) Date of Patent: Oct. 27, 2020

(54) MOLD ASSEMBLY, METHOD FOR PRODUCING INSERT MOLDED ARTICLE, AND INSERT MOLDED ARTICLE

(71) Applicant: KABUSHIKI KAISHA TOKAI RIKA DENKI SEISAKUSHO, Aichi (JP)

(72) Inventor: Shohei Mano, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 319 days.

(21) Appl. No.: 15/812,308

(22) Filed: Nov. 14, 2017

(65) Prior Publication Data

US 2018/0154560 A1  Jun. 7, 2018

(30) Foreign Application Priority Data

Dec. 5, 2016 (JP) .................................. 2016-235874

(51) Int. Cl.
*B29C 45/14* (2006.01)
(52) U.S. Cl.
CPC .............................. *B29C 45/14073* (2013.01)
(58) Field of Classification Search
CPC .... B29C 45/14073; B29C 2045/14122; B29C 2045/14163; B29C 45/1459
See application file for complete search history.

(56) References Cited

U.S. PATENT DOCUMENTS

| | | | | |
|---|---|---|---|---|
| 6,063,321 | A * | 5/2000 | Koyama | ........... B29C 45/14073 264/272.15 |
| 6,309,573 | B1 | 10/2001 | Schoonover et al. | |
| 6,311,387 | B1 * | 11/2001 | Shikama | ............... H01F 41/127 29/602.1 |
| 6,428,732 | B1 * | 8/2002 | Onoue | ................... B29C 33/12 257/E21.504 |
| 2002/0017732 | A1 | 2/2002 | Koyama et al. | |
| 2016/0356627 | A1 * | 12/2016 | Adachi | ................... G01P 1/026 |

FOREIGN PATENT DOCUMENTS

| | | | |
|---|---|---|---|
| JP | S55-39866 | U | 9/1978 |
| JP | 55039866 | U * | 3/1980 |
| JP | S62-173912 | | 11/1987 |
| JP | 06-182812 | A | 7/1994 |
| JP | 09-300385 | A | 11/1997 |
| JP | 10-315276 | A | 12/1998 |
| JP | 2003-127185 | A | 5/2003 |

OTHER PUBLICATIONS

A Office Action issued in corresponding Japanese Application No. 2016-235874 dated Dec. 25, 2018.

* cited by examiner

*Primary Examiner* — Jacob T Minskey
*Assistant Examiner* — Virak Nguon
(74) *Attorney, Agent, or Firm* — Roberts Calderon Safran & Cole P.C.

(57) ABSTRACT

A mold assembly includes a mold body configured to mold an insert molded article, and a support member including at least two support pieces configured to support an insert part in a direction substantially orthogonal to a mold opening and closing direction. The insert part is disposable within the mold body, the support pieces are each configured to be movable between a supporting position and a non-supporting position, and the support pieces are each configured to support the insert part at the supporting position, and not to support the insert part at the non-supporting position.

12 Claims, 3 Drawing Sheets

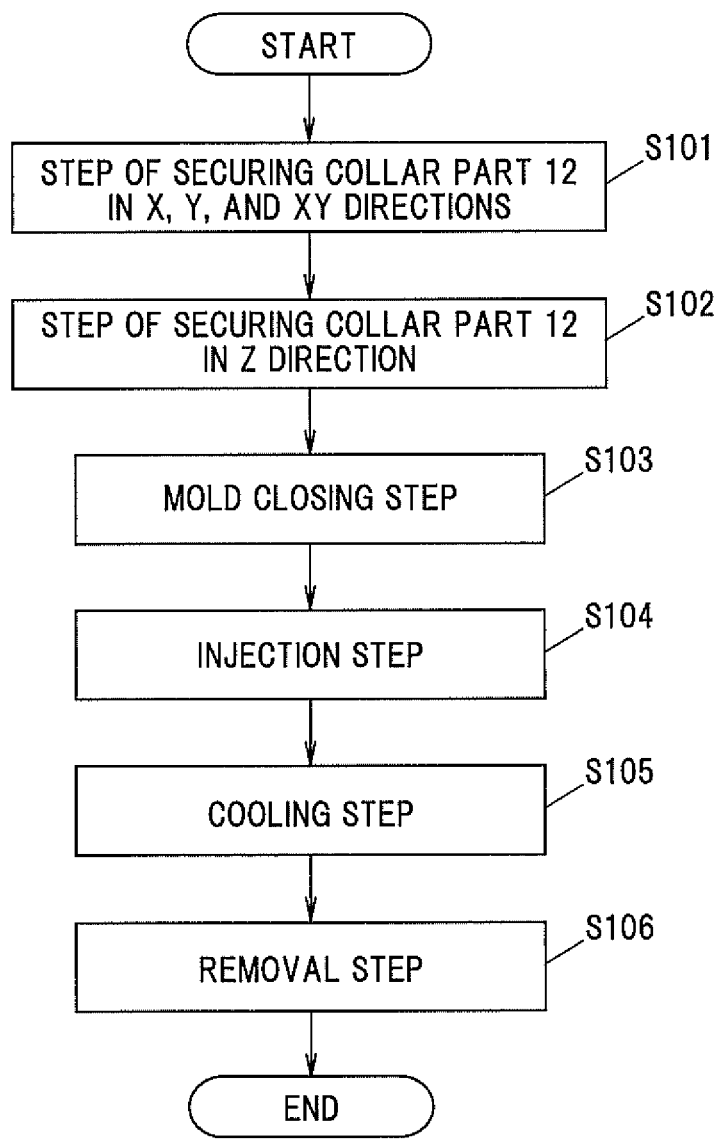

MOLD ASSEMBLY, METHOD FOR PRODUCING INSERT MOLDED ARTICLE, AND INSERT MOLDED ARTICLE

The present application is based on Japanese patent application No. 2016-235874 filed on Dec. 5, 2016, the entire contents of which are incorporated herein by reference.

BACKGROUND

Technical Field

The present invention relates to a mold assembly, a method for producing an insert molded article, and an insert molded article.

Related Art

Among mold assemblies in the related art, there are known mold assemblies for use in insert molding (see, for example, JP H09-300385A).

The mold assembly disclosed in JP H09-300385A is configured so that a plurality of cores can be mounted in the mold. The cores are slidably movable in the direction a molded article is removed. The cores each have a fitting hole into which a fitting pin can be detachably attached in a direction different from the direction the molded article is removed. The fitting pin is formed on each of support members that support the molded article.

The molded article, in which an insert member is inserted and a reaction injection molding resin layer is formed around the periphery of the insert member, can be produced as follows. The fitting pins of the support members are fitted into the respective fitting holes of the cores, and in this state, the plurality of cores are positioned in the mold. Subsequently, the insert member is placed on the support members to be positioned in the mold. Subsequently, an undiluted reactive liquid, which forms the molded article, is injected into the space between the periphery of the insert member, which includes the support members, and the inner peripheral surface of the mold. In this manner, reaction injection molding is carried out.

When the molded article is removed after the mold is opened, the molded article is removed with the cores remaining mounted on the periphery of the molded article. Thereafter, the cores are removed from the periphery of the molded article. After the cores are removed, the fitting pins of the support members appear projecting from the periphery of the molded article. If the fitting pins are unnecessary for the finished product of the molded article, the fitting pins are cut off and removed.

SUMMARY

The mold assembly disclosed in JP H09-300385A requires mounting and removal of the plurality of cores. This requires much effort for molding and leads to increased molding cycle time. As a result, one problem is that the productivity is decreased.

Accordingly, an object of the invention is to provide a mold assembly and a method for producing an insert molded article that achieve shorter molding cycle time and increased productivity, and an insert molded article.

In order to achieve the object described above, according to an aspect of the invention, a mold assembly is primarily configured as follows. The mold assembly includes a mold body and a support member. The mold body is configured to mold an insert molded article. The support member includes at least two support pieces configured to support an insert part in a direction substantially orthogonal to a mold opening and closing direction. The insert part is disposable within the mold body. The support pieces are configured to be movable between respective supporting positions and respective non-supporting positions. The support pieces, when located at the respective supporting positions, are configured to support the insert part, and when located at the respective non-supporting positions, are configured not to support the insert part.

The mold assembly according to the aspect of the invention may be configured as follows. The insert part may be a member having a shape of a cylinder. The mold body may include a projection projecting along the mold opening and closing direction from a plane where the insert part is to be placed. The projection may be configured to allow an inside of the cylinder of the insert part to be fitted to the projection.

The mold assembly according to the aspect of the invention may be configured as follows. The supporting positions may be in substantially a same plane with the insert part disposed between the supporting positions.

According to another aspect of the invention, a method for producing an insert molded article is primarily configured as follows. An insert part is positioned within a mold body and is secured in a direction substantially orthogonal to a mold opening and closing direction. The insert part is secured in the mold opening and closing direction. A molten material forming the molded article is injected into the mold body.

According to another aspect of the invention, an insert molded article is primarily configured to include a molding mark in a surface of an embedding portion within which an insert part is embedded.

According to the aspects of the invention, the need for an inner core for insert molding is eliminated and thus shorter molding cycle time can be achieved. As a result, productivity is increased.

BRIEF DESCRIPTION OF THE DRAWINGS

FIG. 3 is a diagram for describing an example of a production process by injection molding using the mold assembly for insert molding according to the embodiment.

DESCRIPTION OF EMBODIMENTS

Embodiments of the invention will be described hereinafter with reference to the appended drawings. In the description below, provided that any point in the mold is taken as the origin, the Z-axis is defined as an axis extending along the opening and closing direction of the mold, the X-axis is defined as an axis extending in a direction orthogonal to the Z-axis, and the Y-axis is defined as an axis extending in a direction orthogonal to the Z-axis and the X-axis.

Furthermore, provided that a Cartesian coordinate system with the X-, Y-, Z-axes is defined on the mold, X direction is defined as a direction along the X-axis, Y direction is defined as a direction along the Y-axis, Z direction is defined as a direction along the Z-axis, and XV direction is defined as any direction in the plane including the X-axis and the Y-axis (XY plane). In the description below, the X direction, the Y direction, and the XY direction are also referred to as radial directions.

Figure 1A:
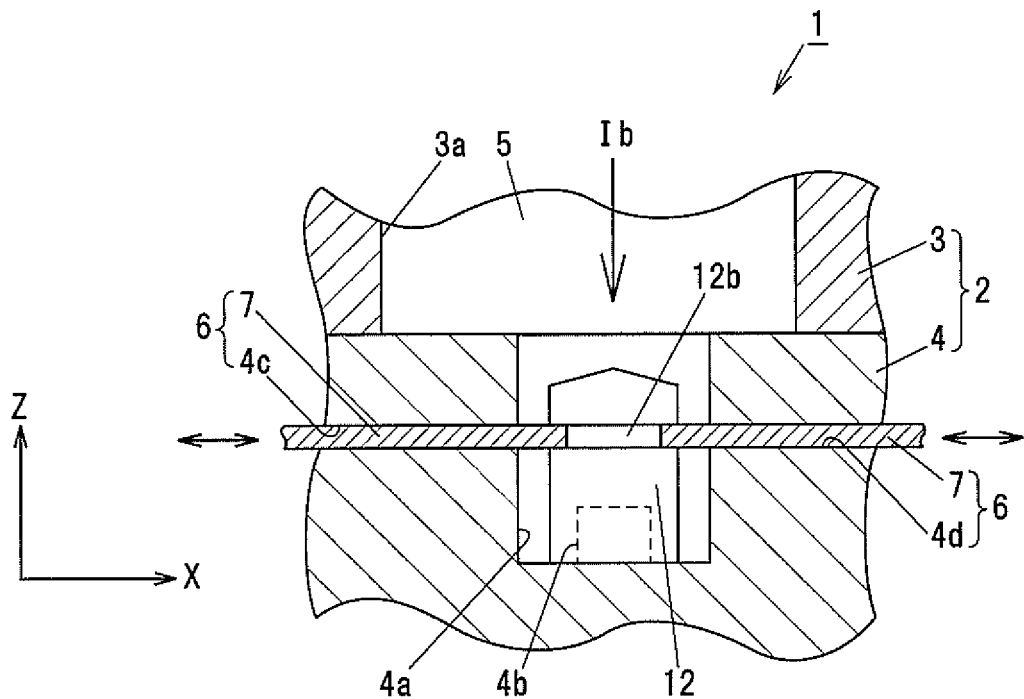
FIG. 1A is a schematic cross-sectional view illustrating a main portion of an example of a mold assembly for insert molding according to an embodiment.
Figure 1B:
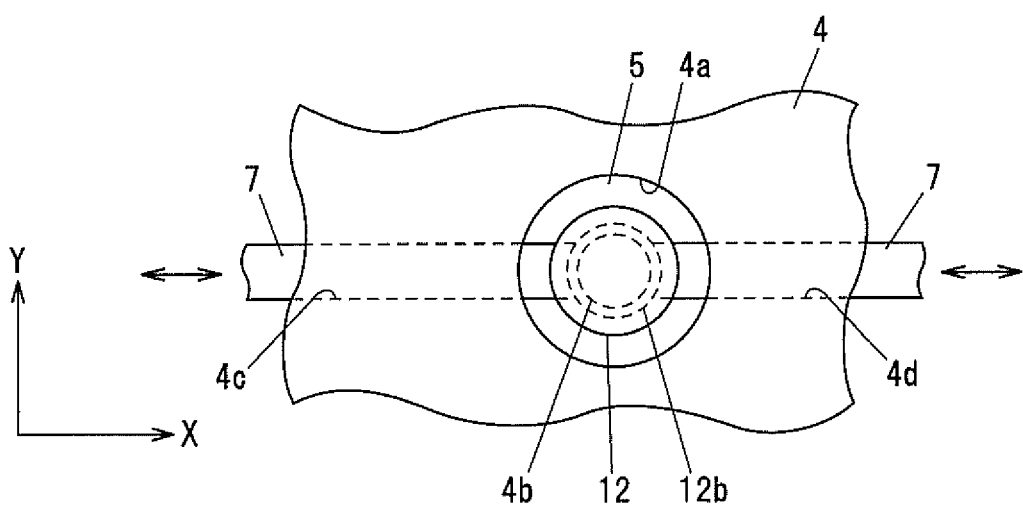
FIG. 1B is a plan view of the main portion, viewed in the direction of the arrow Ib in FIG. 1A.

A mold assembly 1 according to the present embodiment, illustrated in FIGS. 1A and 1B, includes a mold body 2, which is used for insert molding. The mold assembly 1 and an injection apparatus (not illustrated) constitute an injection molding machine.

The mold body 2 includes a first mold 3 and a second mold 4. The first mold 3 is a design surface-side mold half that includes a cavity surface 3a, which is provided to mold the design surface of an insert molded article. On the other hand, the second mold 4 is a non-design surface-side mold half that includes a cavity surface 4a, which is provided to mold the non-design surface (backside), opposite from the design surface, of the insert molded article. In the description below, the first mold 3 is referred to as a design surface-side mold half 3 and the second mold 4 is referred to as a non-design surface-side mold half 4.

Figure 2A:
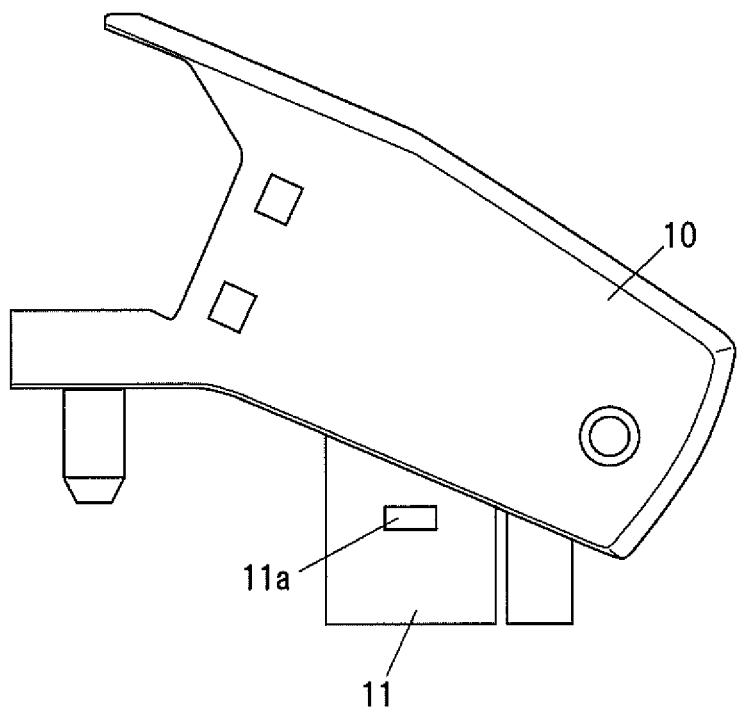
FIG. 2A is a schematic side view illustrating an example of an insert molded article produced using the mold assembly for insert molding according to the embodiment.
Figure 2B:
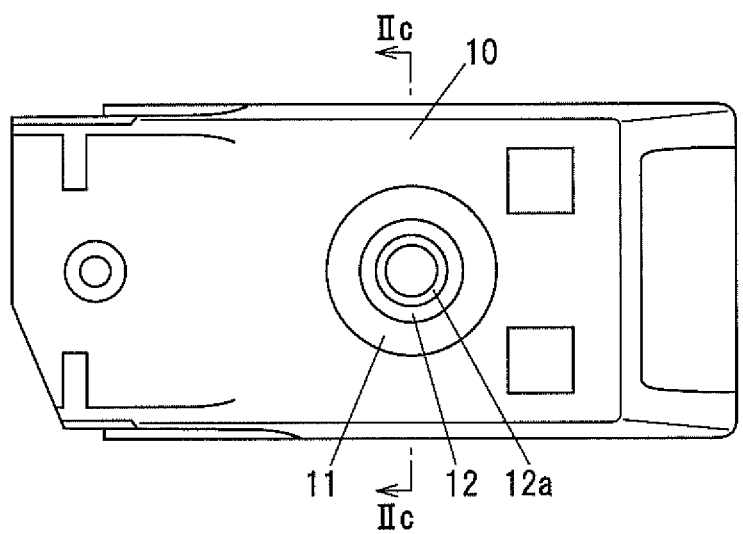
FIG. 2B is a schematic backside view illustrating the example of the insert molded article produced using the mold assembly for insert molding according to the embodiment.
Figure 2C:
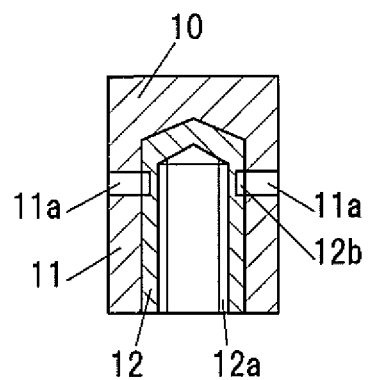
FIG. 2C is a cross-sectional view taken along the line IIc-IIc of FIG. 2B and viewed in the direction of the arrow.

An example of an insert molded article that can be molded using the mold assembly 1, which is an illustrated example, is a resin-molded switch body 10 as illustrated in FIGS. 2A, 2B, and 2C. The switch body 10 is used as a paddle switch of an automobile, for example. The switch body 10 includes a cylindrical mounting boss 11, which projects from the backside.

A collar part 12, which is an example of an insert part, is inserted inside the inner peripheral surface of the boss 11 of the switch body 10. The collar part 12, which is an illustrated example, is a closed-bottom cylindrical body made of metal. The closed-bottom cylinder of the collar part 12 has an internal thread 12a.

As illustrated in FIGS. 1A and 1B, the collar part 12 is supported within the non-design surface-side mold half 4, and when the design surface-side mold half 3 and the non-design surface-side mold half 4 are closed, a cavity 5 is formed by the facing cavity surfaces 3a, 4a of the design surface-side mold half 3 and the non-design surface-side mold half 4. A molten resin is injected into the cavity 5 and cooled. In this manner, the switch body 10, which includes the collar part 12 therein, is molded.

Some constituent parts of the mold assembly 1, such as, for example, ejector pins, guide pins, and a sprue, are omitted from the drawings. There are no particular limitations on such parts, and any known parts may be used. Also, there is no particular limitation on the material of the mold body 2. The mold may be a two-plate mold or a three-plate mold, for example. Also, there are no particular limitations on the size of the mold body 2 nor the shape of the cavity 5.

The non-design surface-side mold half 4 of the mold body 2 includes an insert support structure that positions and supports the collar part 12 within the mold. The insert support structure includes a projection 4b for an insert and a support member 6. The projection 4b restricts the movement of the collar part 12 in the X direction, the Y direction, and the XV direction (secures the collar part 12 in the X direction, the Y direction, and the XV direction). The support member 6 restricts the movement of the collar part 12 in the Z direction (secures the collar part 12 in the Z direction).

Of the insert support structure of the non-design surface-side mold half 4, the projection 4b for an insert is formed on the bottom surface of the cavity 5 in the non-design surface-side mold half 4. The projection 4b has a pillar shape and projects perpendicularly in the mold opening and closing direction. The projection 4b is configured to allow the inside of the closed-bottom cylinder portion of the collar part 12 to be removably fitted to the projection 4b and the open end face of the collar part 12 to be in close contact with the bottom surface of the cavity 5 in the non-design surface-side mold half 4.

By virtue of the projection 4b for an insert, a molten resin is injected into the cavity 5 in a state in which the collar part 12 is secured in the radial directions. This configuration prevents the collar part 12 from protruding from the molten resin.

The support member 6 includes a pair of first and second slidable support pieces 7 and 7, which are disposed to face each other and are substantially symmetrical with respect to a Z-axis extending through the center of the projection 4b for an insert. Each of the support pieces 7 is configured to be movable between a supporting position and a non-supporting position. Each of the support pieces 7, when located at the supporting position, positions and supports the collar part 12, and when located at the non-supporting position, does not position and support the collar part 12.

A pair of first and second slide slots 4c, 4d are respectively formed in the two side walls of the non-design surface-side mold half 4 in the X direction. One of the support pieces 7 is slidably located in the first slide slot 4c and the other of the support pieces 7 is slidably located in the second slide slot 4d. The first slide slot 4c is formed in a position opposite from the position of the second slide slot 4d, with the Z-axis extending through the center of the projection 4b for an insert being the axis of symmetry.

An end of each of the support pieces 7 can be removably fitted into an annular support groove 12b, which is formed along the periphery of the collar part 12. This configuration secures the collar part 12 in the Z direction (mold opening and closing direction). Because of the support groove 12b, which is formed in the collar part 12 so as to allow the support pieces 7 to be correspondingly fitted thereinto, the support by the support pieces 7 is stable at predetermined locations in the collar part 12 and thus is reliable.

As illustrated in FIGS. 2A, 2B, and 2C, when the support by the support pieces 7 is discontinued, molding marks 11a such as holes or hole marks are formed in the molded surface of the boss 11, within which the collar part 12 is embedded for insert molding of the switch body 10. The molding marks 11a are formed in areas of the non-design surface-side mold half 4 that are not visible from the exterior design surface of the switch body 10. As a result, the appearance and design features of the switch body 10 are enhanced.

FIGS. 1A and 1B illustrate a configuration in which the two support pieces 7 face each other and are linearly aligned in the X direction, but the configuration is not limited to this. The two support pieces 7 may be configured to face each other and be linearly aligned in the Y direction or the XY direction provided that the support pieces 7 are configured to be able to secure the collar part 12 in the Z direction.

The number of the support pieces 7 may be three, four, or more than four. In such a case, it is preferred that the support pieces 7 be arranged in the same plane (XY) at a predetermined phase difference (at an angular difference) with the collar part 12 disposed between the support pieces 7. The plane (XY) contains the X-axis and the Y-axis.

By virtue of the support pieces 7 of the support member 6, the collar part 12 can be supported (secured) in the radial directions in a well-balanced manner. Cylinders each including a piston rod may be provided to move the pair of support pieces 7 close to or away from each other. The piston rod is configured to advance and retract the support piece 7 into and from the cavity 5 in the non-design surface-side mold half 4.

By using the mold assembly 1 configured as described above, the switch body 10, which includes the collar part 12 therein, is produced. Herein, an example of a method for producing the switch body 10, which includes the collar part 12 therein, will be described with reference to FIGS. 1A, 1B, and 3.

The switch body 10, which includes the collar part 12 therein, can be produced as follows. First, in step S101, the closed-bottom cylinder portion of the collar part 12 is positioned at the projection 4b for an insert of the non-design surface-side mold half 4, so as to secure the collar part 12 in the radial directions (X direction, Y direction, and XV direction), which are orthogonal to the mold opening and closing direction. (Z direction) of the collar part 12.

Next, in step S102, the pair of support pieces 7 of the non-design surface-side mold half 4 are moved in the X direction, which is orthogonal to the mold opening and closing direction, so as to fit the ends of the support pieces 7 into the support groove 12b of the collar part 12. In this manner, a step of securing the collar part 12 in the Z direction (mold opening and closing direction) is performed.

Next, in step S103, a mold closing step is performed. In the mold closing step, the design surface-side mold half 3 and the non-design surface-side mold half 4 are mated to each other to firm the cavity 5.

Next, in step S104, an injection step is performed. In the injection step, a predetermined amount of molten resin that forms the switch body 10 is injected to fill the cavity 5, which is formed by mating the design surface-side mold half 3 and the non-design surface-side mold half 4 to each other.

Subsequently, in step S105, a cooling step of cooling and solidifying the molten resin is performed.

Thereafter, in step S106, a removal step is performed after a predetermined period of time. In the removal step, the mold body 2 is opened and the switch body 10 is removed from the mold.

By the series of steps described above, the switch body 10, which includes the collar part 12, is completed. There are no particular limitations on the conditions for molding the resin that forms the switch body 10 and on other features. The molding may be performed by a commonly used insert molding method.

As described above, the mold assembly 1 according to the embodiment is preferably configured as follows. Provided that a Cartesian coordinate system with the X-, Y-, and Z-axes is defined on the mold, the mold body 2, which includes the design surface-side mold half 3 and the non-design surface-side mold half 4, includes the support member 6, which includes the two support pieces 7, 7. The support pieces 7, 7 support the closed-bottom cylindrical collar part 12 in at least one direction of the X direction, the Y direction, and the XY direction, which are orthogonal to the Z direction. The collar part 12 is disposed within the non-design surface-side mold half 4.

Preferably, the support piece 7 of each of the support members 6 is configured to be movable between a supporting position and a non-supporting position. The support piece 7, when located at the supporting position, supports the collar part 12, and when located at the non-supporting position, does not support the collar part 12. It is preferred that the support pieces 7 be located in a same plane (XY plane) with the collar part 12 disposed therebetween.

More preferably, the non-design surface-side mold half 4 is configured to include the projection 4b for an insert, and the projection 4b is formed to project so as to allow the inside of the closed-bottom cylinder of the collar part 12 to be fitted to the projection 4b and the open end face of the collar part 12 to be in close contact with the non-design surface-side mold half 4.

The switch body 10, which includes the collar part 12 therein, can be produced using the non-design surface-side mold half 4, desirably by an insert molding method including the following steps. The collar part 12 is positioned at the projection 4b for an insert of the non-design surface-side mold half 4 to secure the collar part 12 in the X direction, the Y direction, and the XY direction, which are orthogonal to the Z direction of the collar part 12. The collar part 12 is secured in the Z direction via the support by each of the support pieces 7.

The switch body 10, which is produced by such an insert molding method, has molding marks 11a in the surface of an embedding portion in which the collar part 12 is embedded. The molding marks 11a have a configuration corresponding to that of the support pieces 7.

In the switch body 10, the molding marks 11a, are formed in the molded surfaces on both sides of the boss 11 in the X direction as a result of pulling out the support pieces 7 when removing the switch body 10 from the mold. The molding marks 11a have a configuration corresponding to that of the support pieces 7 of the non-design surface-side mold half 4. The molding marks 11a are located in areas that are not visible from the exterior design surface of the switch body 10, and can be small. Thus, the appearance of the switch body 10 is not impaired.

With the embodiment, the following effects can be achieved in addition to the effects described above.

The non-design surface-side mold half 4 includes the insert support structure that includes the projection 4b for an insert and the support pieces 7. The projection 4b for an insert secures the collar part 12, which is an insert part, in the radial directions. The support pieces 7 secure the collar part 12 in the mold opening and closing direction. This configuration eliminates the need for an inner core for insert molding.

The configuration provides reliable support for the collar part 12 without complicating the structure of the mold body 2 or increasing its size. The configuration allows a high degree of flexibility in the shape of the switch body 10, which is an insert molded article including the collar part 12 therein.

The configuration eliminates the need for an inner core for insert molding and thus reduces the operations by the mold assembly 1, which leads to reduced molding cycle time. As a result, a reduced number of production steps and reduced production costs are achieved.

The reduced molding cycle time results in efficient mass production.

The operation of the mold assembly 1 is easy and thus can be automated by automated robot. As a result, the switch body 10 can be provided stably and at low cost.

The insert structure is included in the non-design surface-side mold half 4, which molds the backside of the switch body 10, not in the design surface-side mold half 3, for which a high priority is to provide a design advantage for the switch body 10. As a result, the appearance of the switch body 10 is not deteriorated, and thus the switch body 10, which has enhanced exterior design features, is obtained.

As made clear above, the invention according to the scope of the claims is not limited by the representative embodiments, modified examples, and illustrated examples according to the invention described above. As such, it should be understood that all combinations of the features described in the embodiments, modified examples, and illustrated examples are not required parts of the means to achieve the object of the invention.

What is claimed is:

1. A mold assembly, comprising:
   a mold body configured to mold an insert molded article; and
   a support member including at least two support pieces configured to support an insert part in a direction substantially orthogonal to a mold opening and closing direction, wherein the insert part is disposable within the mold body,
   wherein the support pieces are each configured to be movable between a supporting position and a non-supporting position,
   wherein the support pieces are each configured to support the insert part at the supporting position, and not to support the insert part at the non-supporting position,
   wherein the mold body comprises a projection projecting along the mold opening and closing direction from a plane where the insert part is to be placed,
   wherein the projection is configured to allow an inside of the cylindrical member of the insert part to couple with the projection, and
   wherein the projection is configured such that a surface of the mold body closely contacts an open end face of the insert part while allowing the insert part to be secured in the mold opening and closing direction.

2. The mold assembly according to claim 1, wherein the supporting positions of the support pieces are substantially on a same plane while sandwiching the insert part therebetween.

3. The mold assembly according to claim 1, wherein the mold body comprises a slide slot that encloses each of the supporting pieces to allow each of the supporting pieces to move between the supporting position and the non-supporting position.

4. The mold assembly according to claim 3, wherein the supporting pieces are configured to be movable to a position where a tip thereof is enclosed inside of the slide slot.

5. The mold assembly according to claim 1, wherein the supporting pieces comprise a tip portion that is arranged to engage with a groove on a surface of the insert part.

6. The mold assembly according to claim 1, wherein the projection is lower than the support member in the mold opening and closing direction.

7. The mold assembly according to claim 1, wherein the projection is configured such that the surface of the mold body closely contacts all surfaces of the open end face of the insert part.

8. The mold assembly according to claim 1, wherein a cross-sectional area of the projection remains constant in the opening and closing direction.

9. A method for producing an insert molded article, comprising:
   positioning an insert part within a mold body to secure the insert part in a direction substantially orthogonal to a mold opening and closing direction;
   securing the insert part in the mold opening and closing direction by inserting a support member into the insert part in the mold opening and closing direction; and
   injecting a molten material into the mold body to form the insert molded article,
   wherein the positioning of the insert part is conducted by inserting the insert part into a projection of the mold body, the projection projecting along the mold opening and closing direction from a plane where the insert part is to be placed, and
   wherein the projection is configured such that a surface of the mold body closely contacts an open end face of the insert part while allowing the insert part to be secured in the mold opening and closing direction.

10. The method according to claim 9, wherein the projection is lower than the support member in the mold opening and closing direction.

11. The method according to claim 9, wherein the projection is configured such that the surface of the mold body closely contacts all surfaces of the open end face of the insert part.

12. The method according to claim 9, wherein a cross-sectional area of the projection remains constant in the opening and closing direction.

* * * * *